Oct. 11, 1955 S. DETZER 2,720,369
LOCKING MECHANISM FOR RETRACTABLE LANDING GEARS
Filed Sept. 1, 1953 2 Sheets-Sheet 1

Stephen Detzer
INVENTOR.

BY James M. Clark
ATTORNEY.

Oct. 11, 1955            S. DETZER            2,720,369
LOCKING MECHANISM FOR RETRACTABLE LANDING GEARS
Filed Sept. 1, 1953                         2 Sheets-Sheet 2
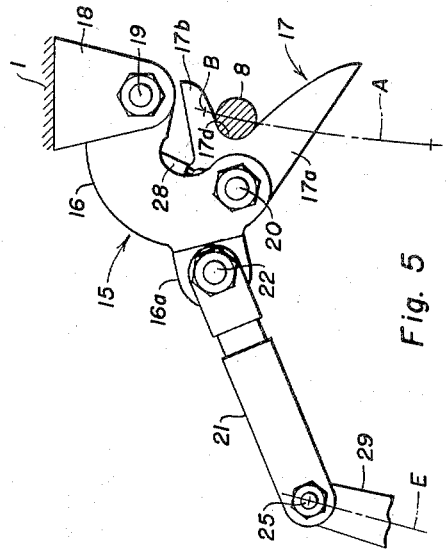
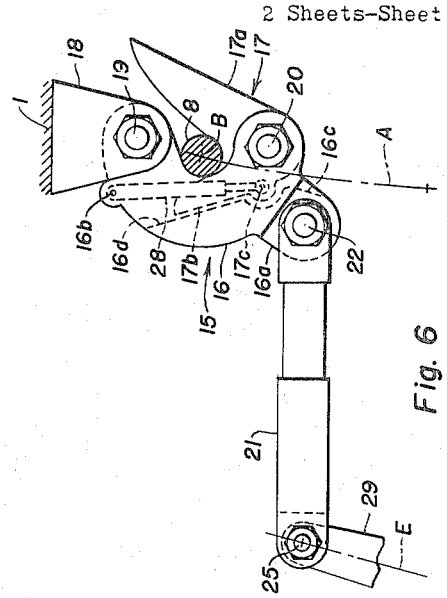
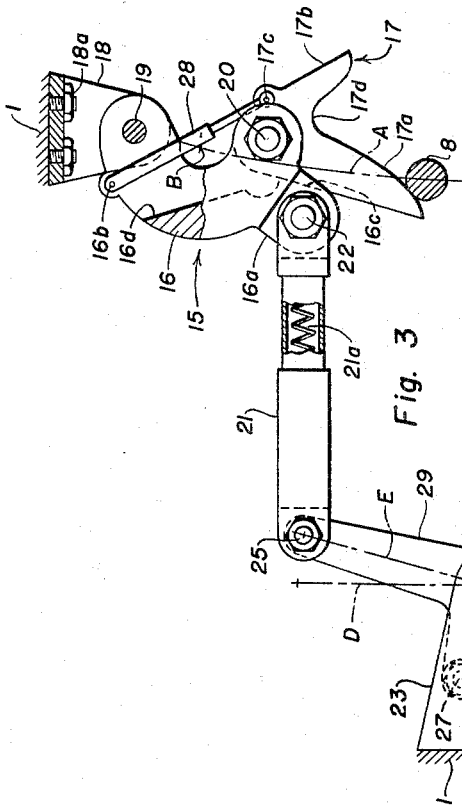
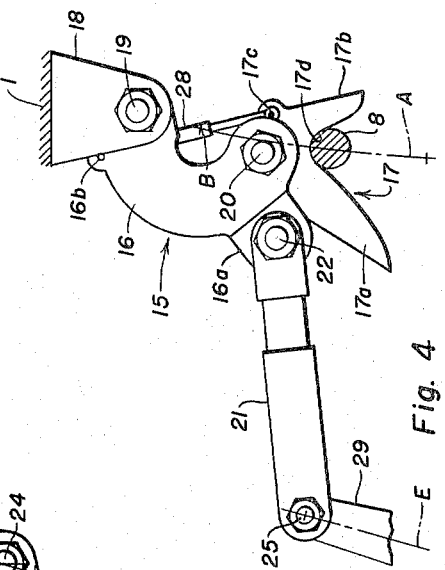
Stephen Detzer
INVENTOR.
BY *James M. Clark*
ATTORNEY.

United States Patent Office 2,720,369
Patented Oct. 11, 1955

2,720,369

LOCKING MECHANISM FOR RETRACTABLE LANDING GEARS

Stephen Detzer, Palos Verdes Estates, Calif., assignor to North American Aviation, Inc.

Application September 1, 1953, Serial No. 377,865

8 Claims. (Cl. 244—102)

The present invention relates to locking mechanisms and more particularly to improvements in the locking mechanisms for landing gears for use on airplanes, test vehicle guided missiles and the like.

It is extremely important in the operation of retractable landing gears for aircraft and other vehicles that the lock which retains the landing gear in its retracted position, generally referred to as the up-lock, be automatic, foolproof and satisfactory in its operation and be positive-acting with a minimum of developed friction. The present invention is directed to an improved up-lock mechanism consisting essentially of a unique arrangement of a pivoted hook, a toggle-biased cam and a spring-loaded actuator in an arrangement which is particularly adapted for the latching of an engaging landing gear part or roller to the airplane or other vehicle structure.

It is a primary objective and advantage of the present invention to provide an automatic lock mechanism for a landing gear without the necessity of using a prime mover or other auxiliary powered device upon the lock. It is a further object to provide such an improved mechanism in which all translational movement is a result of rotation, such as the retraction of the landing gear, to thereby reduce friction. A further object is directed to providing a positive lock by causing the center of the retained roller or landing gear part to move beyond the main pivots of the lock mechanism by means of an over-center locking arrangement obtained with a minimum vertical movement of the landing gear strut.

It is a further object to provide an improved lock arrangement in which the locking hook permits the lock to resist upward as well as downwardly directed loads, as well as a mechanism which requires a minimum of space for up-lock loads. A further object resides in providing a lock of relatively simple construction requiring a minimum amount of machining for the parts of the lock, and obviating the necessity of making delicate adjustments of the lock components. It is a still further object to provide such a locking mechanism in which manual operation is possible due to the small loads required to actuate the mechanism, thereby providing a flexibility of design which allows variations and adaptions in numerous types of installations.

Other objects and advantages of the present invention will occur to those skilled in the art, after reading the following description, taken together with the accompanying drawings, forming a part hereof, in which:

Fig. 3 is a more detailed view of the latching mechanism of Fig. 2 showing the same at the instant of its engagement by the roller on the upwardly moving landing gear strut as it is being retracted;

Fig. 4 is a similar view at a somewhat later stage in the retraction in which the roller engages the recess at the junction of the fingers of the cam element;

Fig. 5 is a similar view at a still later stage in the retractive movement showing the cam and hook elements in rotated positions; and Fig. 6 is a similar view showing the roller in its fully upwardly and positively locked condition in the retracted position of the strut.

Figure 1:
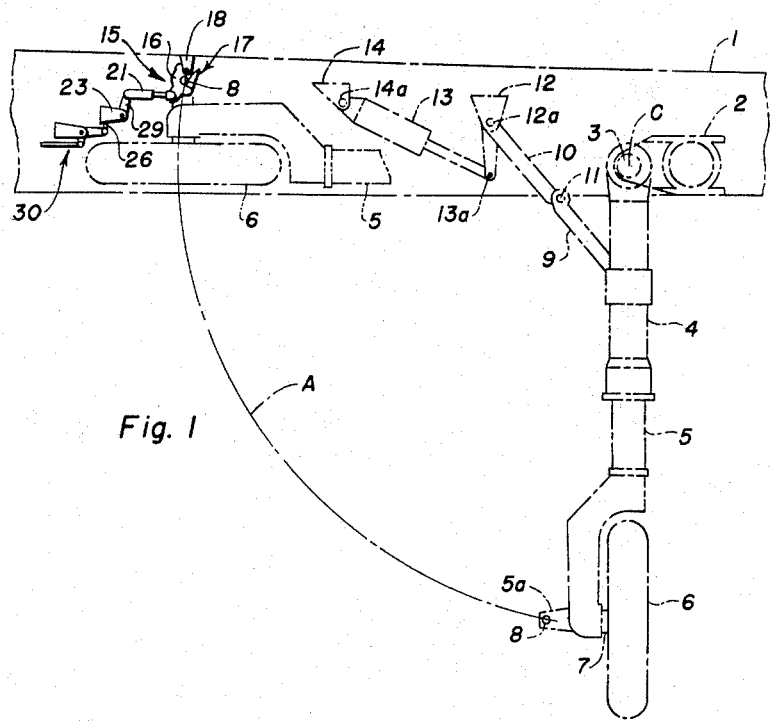
Fig. 1 shows a landing gear retractably supported from an aircraft wing and to which a form of the present up-lock mechanism is shown applied.

Referring now to Fig. 1, the numeral 1 represents the wing of an aircraft, to the internal wing structure of which there is fixedly attached the landing gear hinge fitting 2 for the support of the hinge pin 3. The main landing gear strut is comprised of the upper or cylinder portion 4, within which there is reciprocably supported with suitable interposed shock-absorbing means, the piston portion 5 of the strut. At the lower extremity of the latter there is supported the ground-engaging wheel 6 upon the axle 7 and a bifurcated lug or fitting 5a supporting the lock engaging roller 8. A suitable and well-known nut-cracker or torque scissors linkage (not shown) is provided between the cylinder portion 4 and the piston portion 5 of the main strut to maintain their alignment rotationally while one resiliently reciprocates within the other, and the strut 4 is maintained in its extended operative position by suitable linkage such as the braking strut arrangement having links 9 and 10 with the intermediate pivot 11. The upper link 10 may preferably be in the form of a bellcrank suitably supported at the pivot 12a upon the bracket 12 carried by the wing structure and the other arm of the bellcrank may be pivotally attached to an actuating cylinder 13 such as by the pivotal connection 13a at the outer extremity of its piston portion. The actuating cylinder 13 is suitably supported from the wing supported bracket fitting 14 at the pivot 14a and is suitably connected by hydraulic conduits to a source of fluid supply under the control of the operator. It will be understood that the present invention resides primarily in the novel up-lock mechanism, and accordingly the particular landing gear strut and the mechanism for its actuation is shown by way of illustration only and therefore may be of other type than that which has been selected for purposes of the present description.

As more particularly shown in Fig. 2 and the succeeding figures, the improved up-lock mechanism 15 consists essentially of the hook 16, the cam 17 and the spring-loaded actuator 21 operatively attached by mechanism to be described below to the airplane structure. The hook 16 is a C shaped metal part with main holes or apertures at its upper and lower extremities for the pivots 19 and 20 and in a boss 16a provided on its lower rear side it is provided with a further aperture for the pivotal connection 22 to the spring-loaded actuator 21. An auxiliary pivot hole 16b is located in a further small boss on the upper rear side of the hook fitting for the over-center spring or toggle biasing unit 28 to be more particularly described below. The cam 17 is a two-fingered part with a main pivot aperture for the pivot 20 near the junction of the longer finger 17a and the shorter finger 17b. The cam fitting 17 is also provided with an auxiliary aperture 17c in a small boss near the base of the shorter finger for the pivotal connection of the above-mentioned over-center unit 28, and the junction of the longer and shorter fingers provides a rounded recess or crotch portion 17d contoured to closely fit the radius of the contacting surface of the roller 8 carried by the landing gear strut. The locking mechanism 15 is supported from the wing structure by the bracket 18 attached by the mounting bolts 18a and providing the support for the main hook pivot 19. The actuator link 21 is a cylindrical or rod-like member arranged to be collapsed or retracted against its spring load provided by the compression spring 21a to thereby provide a lost-motion device, and its construction is such that it cannot be extended beyond the length shown in Fig. 3, or its unopposed length prior to the engagement of the locking assembly by the roller 8.

The hook fitting 16 is pivotally mounted in a manner which permits its free rotation about the pivot 19 as opposed by the compressible spring-loaded actuator 21, and the cam fitting 17 is similarly mounted to rotate freely upon the pivot 20 passing through the cam 17 and the lower main aperture in the hook fitting 16. The above referred to over-center spring unit 28 is mounted between the auxiliary hole 16b in the hook 16 and the hole 17c in the cam 17, and is arranged to hold or bias the cam 17 in either an up or down position against the stops 16c and 16d which are built into the hook 16. The spring-loaded actuator 21 is pivotally connected at its bifurcated terminal by the pivot 22 to the boss 16a formed on the lower rear side of the hook fitting 16.

The components and parts of the improved locking mechanism are assembled and adjusted such that with the cam 17 in the down position and the bellcrank 22 in the position E as shown in Fig. 3, and the landing gear strut and its roller 8 being retracted toward the locking mechanism, the roller 8 on the strut will first engage the longer finger 17a of the two fingers of the cam as shown in this figure. As the roller 8 moves upwardly along the cam finger 17a, with the cam bearing against the lower stop 16c on the hook 16, the roller 8 rotates the entire assembly about the structure mounting pivot 19 against the spring load in the actuator rod 21. As the roller reaches the radius portion 17d between the fingers 17a and 17b in the cam, the center of the roller 8 is in such a position with respect to the upper and lower pivot pins 19 and 20 in the hook 16 that it tends to rotate the cam upwardly and in the counterclockwise direction about the lower pivot 20 in the hook 16. The roller 8 therefore in moving upwardly along its arcuate path of retraction A about the center C of the strut hinge support 3 gradually moves from the position shown in Fig. 4 to that shown in Fig. 5 in which the over-center spring or toggle biasing unit 28 has been compressed to its maximum and is substantially aligned between its upper pivot 16b and the hook pivot mounting 20. As the roller 8 continues its upward movement toward the pivot 19, the over-center spring unit 28 assists the cam, (as it gets beyond the dead-center position) in rotating it in the counterclockwise direction to its extreme position in which it bears against the upper stop 16d within the recessed portion of the hook 16. The spring load in the actuator 21 at the same time assists the hook 16 to rotate into the position in which the center of the roller 8 lies between and beyond the line of centers of the pivot bolts 19 and 20 in the hook 16. In this position of the strut roller 8 in which its center coincides with the pivot B at the upper limit of the retractive path A, the landing gear strut is positively locked in the up position.

Figure 2:
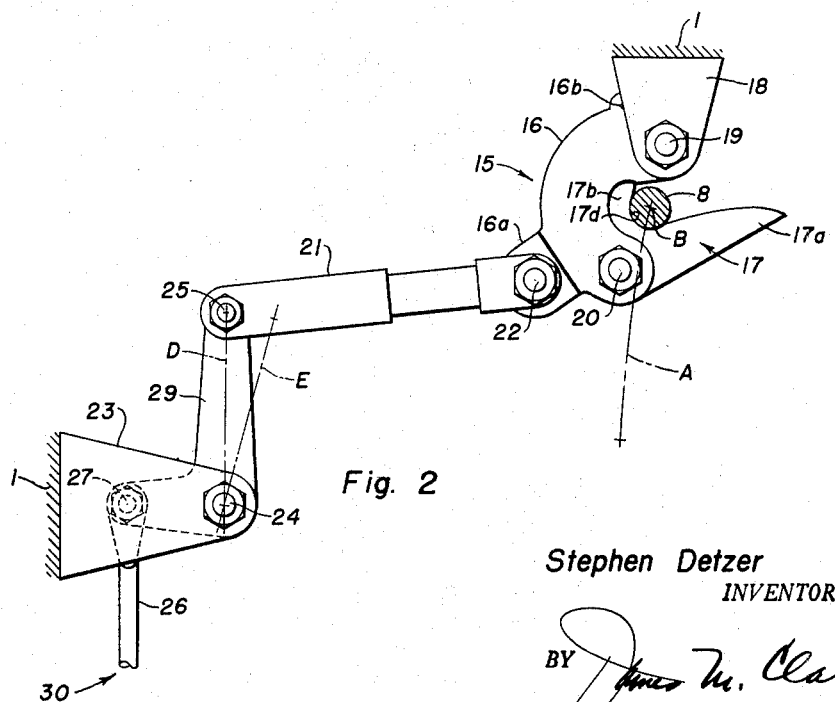
Fig. 2 is an enlarged view of the up-lock mechanism as viewed in Fig. 1 in a partially released condition.

Suitable means for the manual or mechanical release of the roller 8 from the locking mechanism 15 is provided by the release mechanism 30 shown in Figs. 1 and 2. This mechanism consists essentially of the bellcrank member 29 pivotally supported from the bracket 23 as by the pivot 24, the upper arm of the bellcrank 29 being pivotally connected to the actuator 21 by the pivot 25 and its other arm pivotally connected to the generally vertical push-pull actuator rod 26 at the pivot 27. From the fully locked position and arrangement of the components shown in Fig. 6, with the bellcrank 29 in position E, the roller 8 is released and the locking mechanism tripped by actuation of the release mechanism 30 and concurrent downward pull upon the rod 26 as shown in Fig. 2. This causes maximum extension of the actuator 21 to its fixed limit beyond which it imparts clockwise rotation to the hook 16 about its supporting pivot 19 to the point shown in Fig. 2 in which the pivot 20 is drawn to the left beyond the continuation of the line connecting the center of the roller 8 with the pivot 19. In this position of the parts shown in Fig. 2, in which the bellcrank 29 reaches the release position D, the weight and extension force applied to the landing gear imparts clockwise rotation to the cam element 17 about its pivot 20, again compressing the over-center unit 28 until it passes beyond its dead center position shown in Fig. 5, beyond which the cam 17 continues in its clockwise rotation and the roller 8, together with the landing gear assembly falls free from the locking mechanism 15. Accordingly, to release or trip the locking mechanism, the actuator 21 is retracted or moved to the left either mechanically or manually and the process described above in connection with the retraction of the landing gear and its locking in the up-position is accordingly reversed thereby allowing the landing gear to extend by gravity or by means of the conventional hydraulic actuating cylinder 13. The latching mechanism 15 is reset into the operative position while the landing gear is extended by actuation of the mechanism 30 in the opposite direction by return of the bellcrank 29 to the position E, as shown in Fig. 3, at which it is conditioned for the automatic latching of the strut part 8 as the gear is again retracted.

Other forms and modifications of the present invention both with respect to its general arrangement and the details of its respective parts, which may become apparent to those skilled in the art after reading the present description, are intended to come within the scope and spirit of this invention, as more particularly set forth in the following claims.

I claim:

1. Mechanism for latching a relatively movable member to a support comprising a first element movably mounted upon the support, a second element movably mounted upon said first element, a lost-motion means operatively connected to said first element arranged to urge its pivotal support of said second element into the path of said relatively movable member, and resilient means operatively interconnecting said first element with said second element for rotating said mounting of said second element upon said first element beyond the path of said relatively movable member for the positive locking of said relatively movable member to the support.

2. Mechanism for latching a relatively movable member to a support comprising a first element pivotally mounted upon the support, a second element pivotally mounted upon said first element, a resiliently compressible link operatively connected to said first element arranged to urge its pivotal support of said second element into the path of said relatively movable member, and over-center spring means operatively interconnecting said first element with said second element for rotating said pivotal support of said second element upon said first element beyond the path of said relatively movable member with the pivotal support of said first element for the positive locking of said relatively movable member to the support.

3. An up-lock mechanism for latching a relatively movable strut element to a support structure comprising a hook element pivotally mounted upon said support, a fingered cam element pivotally mounted upon said hook element, a resiliently compressible link operatively connected to said hook element and to relatively fixed support structure arranged to urge its pivotal support of said cam element into the path of said relatively movable strut element, and over-center spring means operatively interconnecting said hook element with said cam element for rotating said pivotal support of said cam element upon said hook element when the fingered cam element is engaged by said strut element beyond the center-line connecting the center of said relatively movable strut element with the pivotal support of said hook element for the positive locking of said relatively movable strut element to the support structure.

4. An up-lock mechanism for latching a relatively movable strut element to a support structure comprising a hook element pivotally mounted upon said support, a fingered cam element pivotally mounted upon said hook element, a resiliently compressible link operatively connected to said hook element and to relatively fixed support structure arranged to urge its pivotal support of said cam element into the path of said relatively movable strut element, means for retracting said strut element along an arcuate path, over-center spring means operatively interconnecting said hook element with said cam element for rotating said pivotal support of said cam element upon said hook element when the fingered cam element is engaged by said strut element beyond the centerline connecting the center of said relatively movable strut element with the pivotal support of said hook element for the positive locking of said relatively movable strut element to the support structure, and release mechanism for extending said link for moving said pivotal support of said cam element to the opposite side of said arcuate path.

5. Locking mechanism for latching a relatively movable strut element to a supporting structure, said locking mechanism comprising a hook element pivotally mounted upon said supporting structure, a cam element having a pair of contoured fingers pivotally mounted upon said hook element, a resiliently compressible actuator element pivotally engaging said hook element for movement of said hook element from an idle condition to an operative condition upon movement of said relatively movable strut element to its latching position carried between the contoured fingers of said cam element, and resilient toggle means interconnecting said hook element with said cam element for urging said cam element about its pivotal mounting upon said hook element into either its idle condition in which said cam fingers are engageable by said strut element or into the latched condition of said strut element as said cam element is rotated beyond its dead center.

6. Locking mechanism for latching a relatively movable strut element to a supporting structure, said locking mechanism comprising a hook element pivotally mounted upon said supporting structure, a cam element having a pair of contoured fingers pivotally mounted upon said hook element, a resiliently compressible actuator element pivotally engaging said hook element for movement of said hook element from an idle condition to an operative condition upon movement of said relatively movable strut element to its latching position carried between the contoured fingers of said cam element, resilient toggle means interconnecting said hook element with said cam element for urging said cam element about its pivotal mounting upon said hook element into either its idle condition in which said cam fingers are engageable by said strut element or into the latched condition of said strut element as said cam element is rotated beyond its dead center, and release mechanism for extending said actuator element for moving said pivotal support of said cam element to a position in which its rotation is assisted by said toggle means for the release of said strut element.

7. In an aircraft, the combination with a retractable landing gear, of an up-lock for the landing gear comprising a hook element pivotally supported upon the aircraft, a cam element pivotally supported by said hook element arranged to normally be directed toward a cooperating part of the retractable landing gear to oppose further retraction of the gear, a resiliently compressible link pivotally connected to said hook element arranged for urging said hook element into the position in which it assists said cam element in opposing retraction of said landing gear part, a resilient toggle means interconnecting said hook element with said cam element, said resilient toggle means arranged to position said cam element for engagement by said landing gear part during retraction, said cam element provided with contoured fingers and an intermediate notched portion arranged to be engaged by said retracting landing gear part and rotated about said pivotal support upon said hook element for movement of said landing gear part into a latched position between and beyond the pivotal support of said hook element.

8. In an aircraft, the combination with a retractable landing gear, of an up-lock for the landing gear comprising a hook element pivotally supported upon the aircraft, a cam element pivotally supported by said hook element arranged to normally be directed toward a cooperating part of the retractable landing gear to oppose further retraction of the gear, a resiliently compressible link pivotally connected to said hook element arranged for urging said hook element into the position in which it assists said cam element in opposing retraction of said landing gear part, a resilient toggle means interconnecting said hook element with said cam element, said resilient toggle means arranged to position said cam element for engagement by said landing gear part during retraction, said cam element provided with contoured fingers and an intermediate notched portion arranged to be engaged by said retracting landing gear part and rotated about said pivotal support upon said hook element for movement of said landing gear part into a latched position between and beyond the pivotal support of said hook element and the pivotal support of said cam element into which locked position the said landing gear part is urged and retained by said resiliently compressible link and said resilient toggle means, and release mechanism for extending said resiliently compressible link for moving said pivotal support of said cam element to a position permitting release of said landing gear part.

References Cited in the file of this patent

UNITED STATES PATENTS

| | | |
|---|---|---|
| 2,567,114 | Linn | Sept. 4, 1951 |
| 2,661,171 | Allen | Dec. 1, 1953 |

FOREIGN PATENTS

| | | |
|---|---|---|
| 610,698 | Great Britain | Oct. 19, 1948 |